H. G. ROBERTSON.
Bee Hive.
No. 14,168.
2 Sheets—Sheet 1.
Patented Jan. 29, 1856.
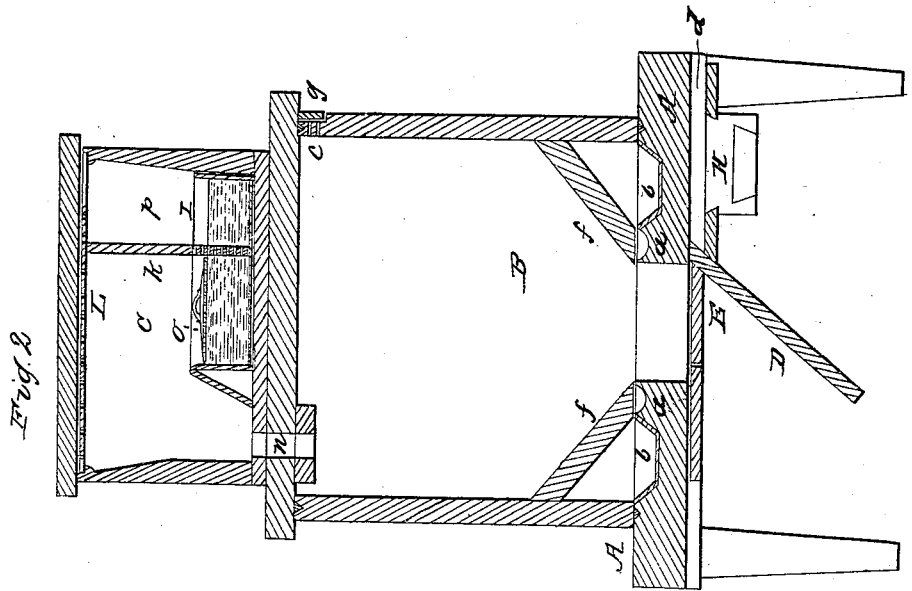
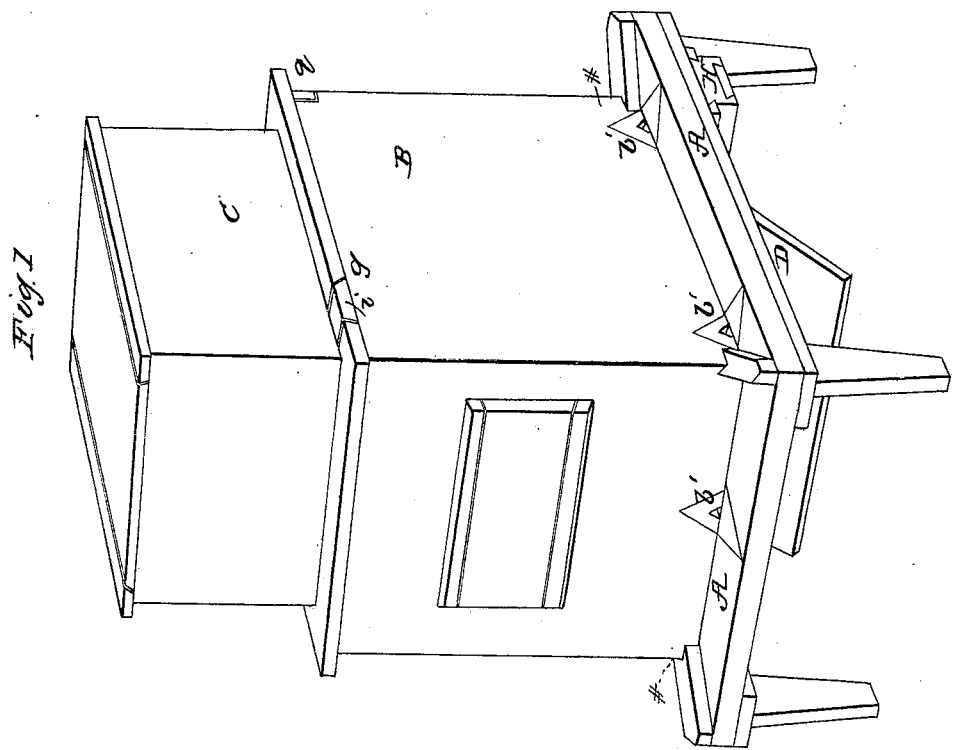

H. G. ROBERTSON.
Bee Hive.
No. 14,168.
2 Sheets—Sheet 2.
Patented Jan. 29, 1856.
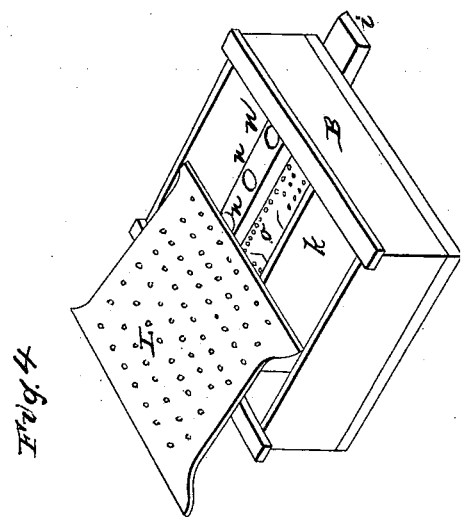
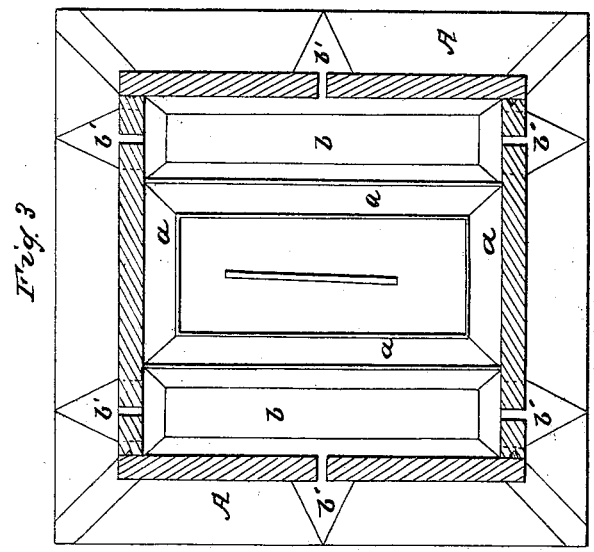

UNITED STATES PATENT OFFICE.

H. G. ROBERTSON, OF GREENEVILLE, TENNESSEE.

BEEHIVE.

Specification of Letters Patent No. 14,168, dated January 29, 1856.

*To all whom it may concern:*

Be it known that I, H. G. ROBERTSON, of Greeneville, in the county of Greene and State of Tennessee, have invented certain new and useful Improvements in Beehives, of which the following is a full, clear, and exact description, reference being had to the accompanying drawing, which makes part of this specification, and in which—

Figure 1 is a view in perspective of the hive; Fig. 2 is a vertical section at the line $x\ x$ of Fig. 1. Fig. 3 is a horizontal section at the line $\#\ \#$ of Fig. 1 and Fig. 4 is a view in perspective of the feeding box with its lid removed, and its perforated lid pushed to one side.

My invention and improvements relate to the protection of the hive against the depredations of the bee-moth, and to the feeding of the swarm when their stock of honey becomes exhausted. The hive consists of a bench A, a box B to contain the bees and to store honey and a feeding box C. The bench A is composed of a rectangular platform supported on four legs, and has an oblong opening through the middle to allow the bees to pass in and out of the hive. This opening is fitted with an inclined board D on which the bees alight on entering the hive, and from which they start in leaving it. The opening is also fitted with a sliding shutter E by which its width can be adjusted. On the upper side of the platform and around the edge of the opening, a groove ($a$) is formed to receive caustic lime, to pack the joints between the box A and the platform, so that it shall not afford a lodgment for the moths or worms. Outside of the groove ($a$) on either side of the opening a trough $b$ is sunk into the face of the platform, to contain water to trap and drown the moths. These troughs have each an entrance $b'$ at either end, and one on the outer side; and these entrances are painted a brilliant white to lure the moths to the opening, as this color is found by experiment to prove nearly as attractive to the moth as a light, and draws most of them away from the entrance to the hive. A sliding drawer trap H for moths, is fixed to the under side of the platform, and the entrance to it is through the opening $d$ at the under edge of the platform. The box B in this instance is of rectangular form, and has an aperture in one of its sides fitted with a pane of glass, and with a sliding shutter, by means of which, the operations of the bees within, can be inspected with facility, and without danger of being stung. On the inside of the lower part of the box, two inclined boards $f\ f$ are placed, which slope from the sides toward the middle, so as to shoot out and discharge all the crumbs, etc., which drop down from the comb, while they at the same time separate the water troughs $b$ from the interior of the hive. A dovetailed groove $g$ is formed near one edge of the top of the box B to receive a tongue $i$ of corresponding form, on the bottom of the box C to unite the two together. A series of holes $n$ are made through the bottom of the box C the tongue $i$ and the bottom of the groove $g$ so as to form a communication by means of which the bees can pass from one box to the other. Near the top of one side of the box (B) a series of ventilating apertures (,) are made which are fitted on the outside with a sliding register (.) by means of which they can be opened or closed at will.

The feeding box has a trough I fitted into it which covers about two thirds of its bottom, leaving only sufficient space around the holes $n$ for the bees to pass and repass. The feeding trough I is divided by a diaphragm $k$ which extends to the top of the box; this diaphragm is perforated at the bottom to allow the liquid food to run freely from one side of it to the other. The compartment of the trough on the same side of the diaphragm with the entrance for the bees, is fitted with a float $o$ which lies on the surface of the molasses or other food for the bees. This float is perforated with numerous holes to enable the bees to get at the food, while the spaces on the float between the holes, will support the bees, so as to prevent them from getting smeared and entangled in the food. The upper part of the box is fitted with a perforated plate L which covers the entrance from the box below, and the feed trough adjacent thereto, while the compartment $p$ between the diaphragm $k$ and the opposite side of the box is left uncovered to admit the food, which is supplied in quantities sufficient for one or more days, as may be deemed expedient. The float $o$ in the compartment of the trough rises as the quantity of feed liquor is increased, and falls as it is consumed, so that the bees can feed with equal facility whether the liquor be high or low in the trough.

The feed box is fitted at the top with a sliding cover that can be removed to introduce feed, to obtain access to the interior, or for the purpose of ventilating the hive.

All the joints of both boxes, as well as the joint between the edges of the box and the bench, have grooves (z) formed in them to receive caustic lime which is tightly packed therein. The object of this lime packing is to destroy the larvæ hatched from eggs laid in the joints, or which seek to enter the hive thereat.

I do not claim lime as a material for packing the joints of my hive, but merely indicate it as the most suitable, for that purpose, among several materials offensive to insects which I know of that could be used with more or less advantage.

What I claim as my invention, and desire to secure by Letters Patent, is—

Making the joints hollow and stuffing them with caustic lime or other matter offensive to insects in the manner and for the purpose specified.

In testimony whereof I have hereunto subscribed my name.

H. G. ROBERTSON.

Witnesses:
J. C. LANE,
JOHN D. McCURDY.